(12) United States Patent
Ozaki et al.

(10) Patent No.: US 7,714,773 B2
(45) Date of Patent: May 11, 2010

(54) RFID TAG DISTANCE MEASURING SYSTEM AND READER

(75) Inventors: Tomohiro Ozaki, Kyoto (JP); Hideyuki Ohara, Kyoto (JP); Takehiro Kawai, Kyoto (JP); Keisuke Saito, Kyoto (JP)

(73) Assignee: Omron Corporation, Kyoto (JP)

( * ) Notice: Subject to any disclaimer, the term of this patent is extended or adjusted under 35 U.S.C. 154(b) by 197 days.

(21) Appl. No.: 11/727,777

(22) Filed: Mar. 28, 2007

(65) Prior Publication Data

US 2007/0241904 A1 Oct. 18, 2007

(30) Foreign Application Priority Data

Mar. 28, 2006 (JP) .............................. 2006-088996

(51) Int. Cl.
*G01S 13/08* (2006.01)

(52) U.S. Cl. ................ 342/118; 340/572.1; 340/539.21

(58) Field of Classification Search ................... 342/118
See application file for complete search history.

(56) References Cited

U.S. PATENT DOCUMENTS

| 6,198,433 | B1 * | 3/2001 | Herault et al. | ............... | 342/372 |
| 6,996,077 | B1 * | 2/2006 | Suenaga et al. | ............. | 370/320 |
| 2004/0225432 | A1 * | 11/2004 | Pilley et al. | .................. | 701/117 |
| 2004/0246168 | A1 * | 12/2004 | Isaji | ............................. | 342/70 |
| 2005/0190098 | A1 * | 9/2005 | Bridgelall et al. | ........... | 342/118 |
| 2006/0238742 | A1 * | 10/2006 | Hunt et al. | .................. | 356/5.15 |
| 2006/0261938 | A1 * | 11/2006 | Lai et al. | ..................... | 340/505 |

FOREIGN PATENT DOCUMENTS

| EP | 1239634 | 9/2002 |
| JP | 08-194058 | 7/1996 |
| JP | 08-248127 | 9/1996 |
| JP | 2001-021645 | 1/2001 |
| JP | 2002-323556 | 11/2002 |
| JP | 2005-311740 | 11/2005 |
| JP | 2005-351878 | 12/2005 |
| JP | 2006-020083 | 1/2006 |

* cited by examiner

*Primary Examiner*—Thomas H Tarcza
*Assistant Examiner*—Timothy A Brainard
(74) *Attorney, Agent, or Firm*—Dickstein Shapiro LLP

(57) ABSTRACT

An RFID tag distance measuring system includes a reader that outputs a predetermined carrier signal to a tag and receives a reflected signal of the carrier signal from the tag. The reader has signal output means for outputting signals at multiple frequencies, which are different from each other, as the carrier signal, a transmitting section that transmits a signal output by the signal output means to the tag, a receiving section that receives reflected signals of the signals at multiple frequencies, which are different from each other, from the tag and estimating means for estimating the distance between the tag and the reader based on the amount of change in phase between the reflected signals received by the receiving section and the carrier signals and the frequencies of the carrier signals. The transmitting section and the receiving section have two pairs of transmit and receive antennas that obtain multiple receive signals in which the strengths of the reflected signals vary differently when the receiving section receives the reflected signals.

6 Claims, 14 Drawing Sheets

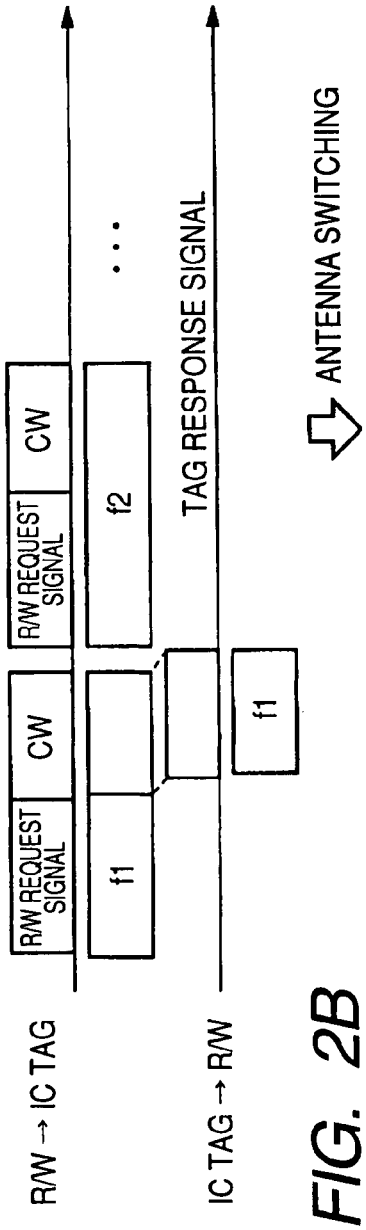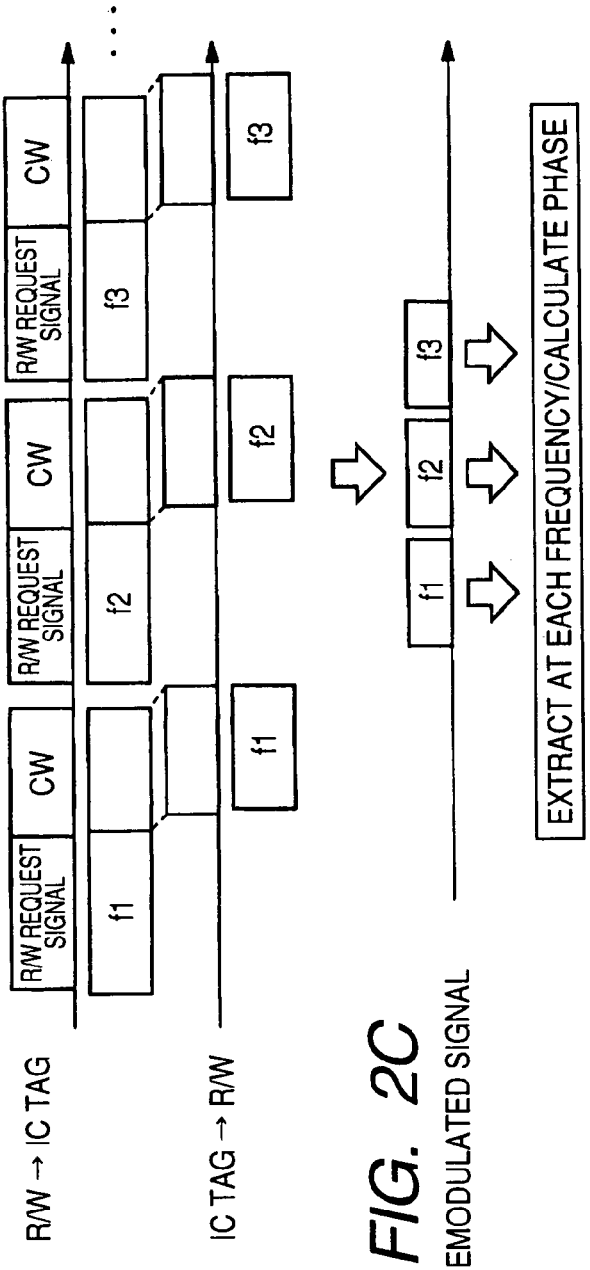

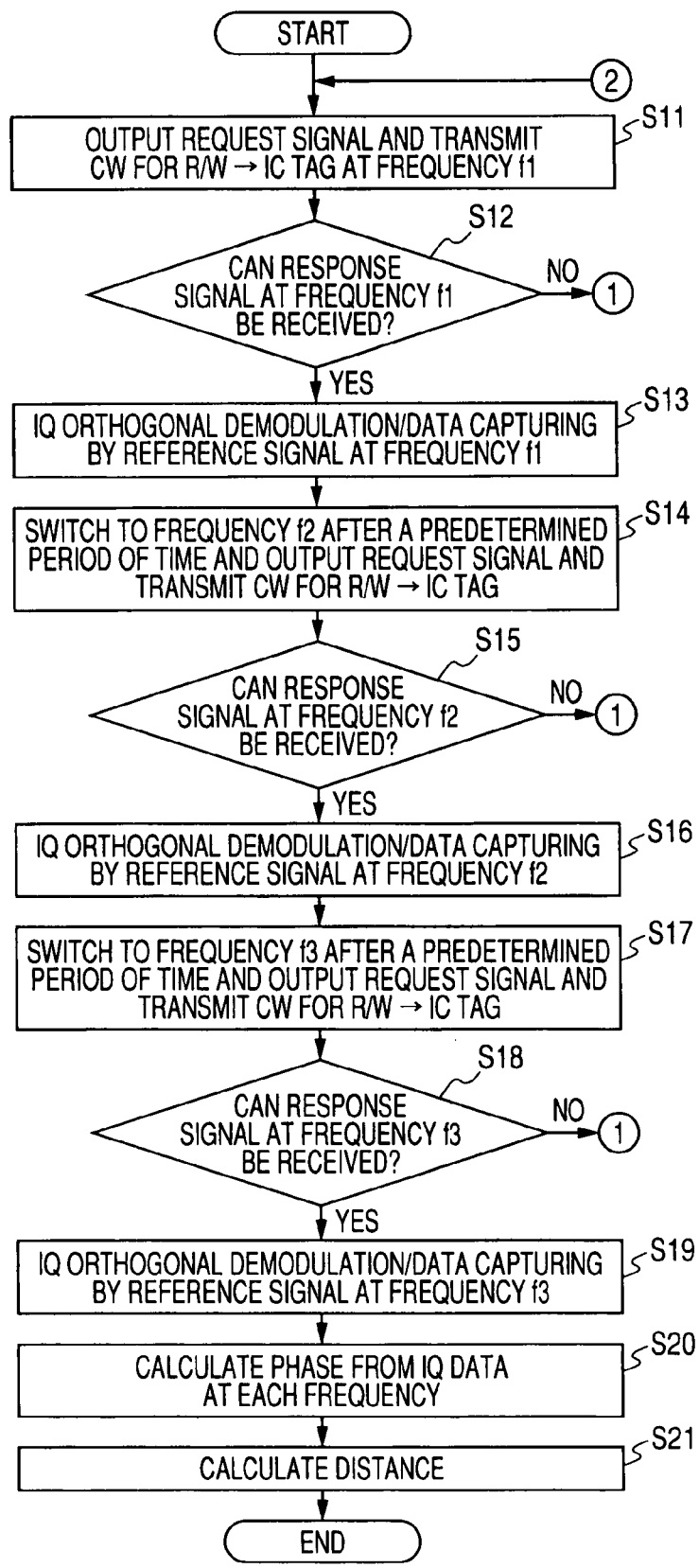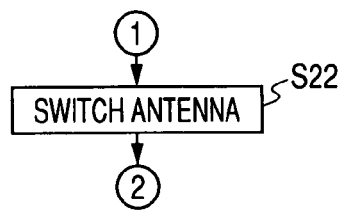

ESTIMATED ERROR DUE TO CHANGE IN ANTENNA POSITION

ESTIMATED ERROR DUE TO CHANGE IN ANTENNA POSITION

DISTRIBUTION OF ELECTRIC FIELD
STRENGTH OF PATCH ANTENNA

DISTRIBUTION OF ELECTRIC FIELD
STRENGTH OF SCAN ANTENNA

ESTIMATED ERROR DUE TO CHANGE IN ANTENNA'S DIRECTIVITY

ESTIMATED ERROR DUE TO CHANGE IN ANTENNA'S DIRECTIVITY

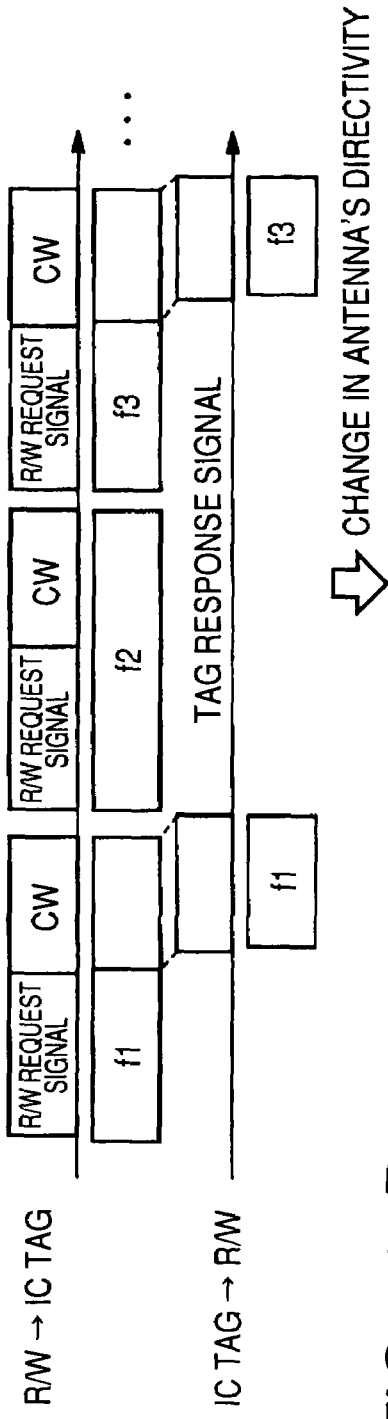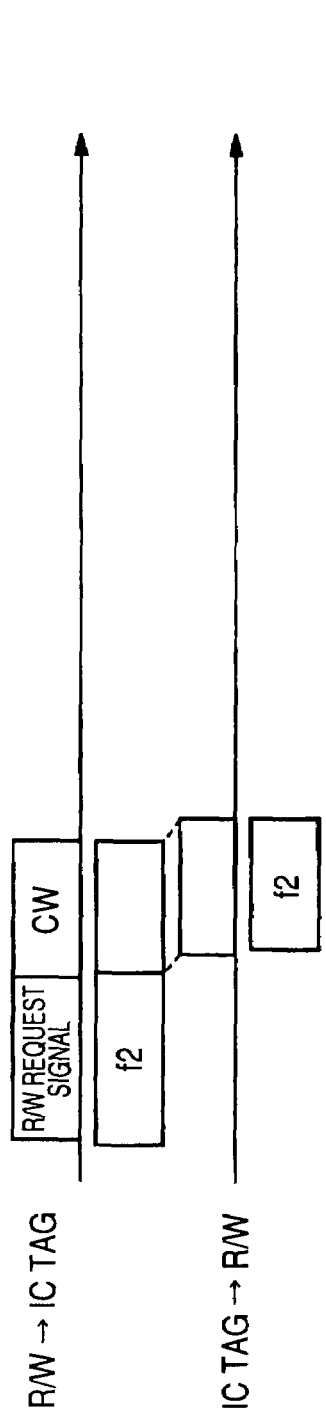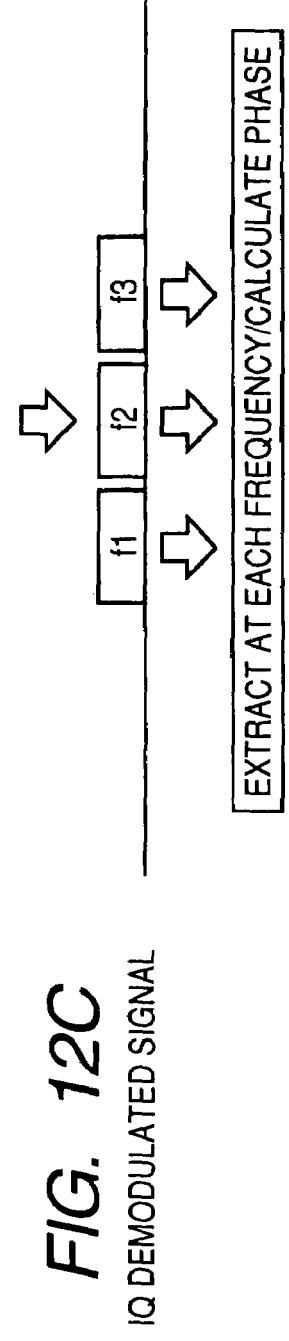

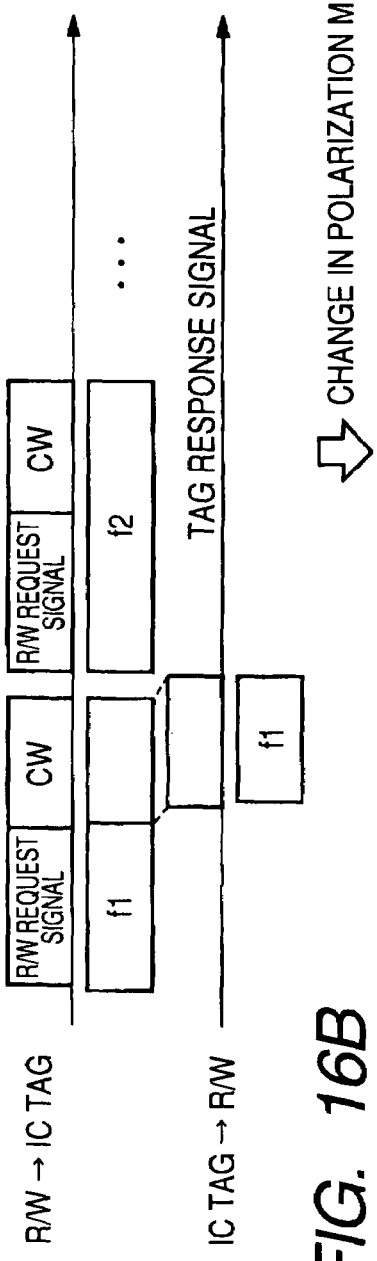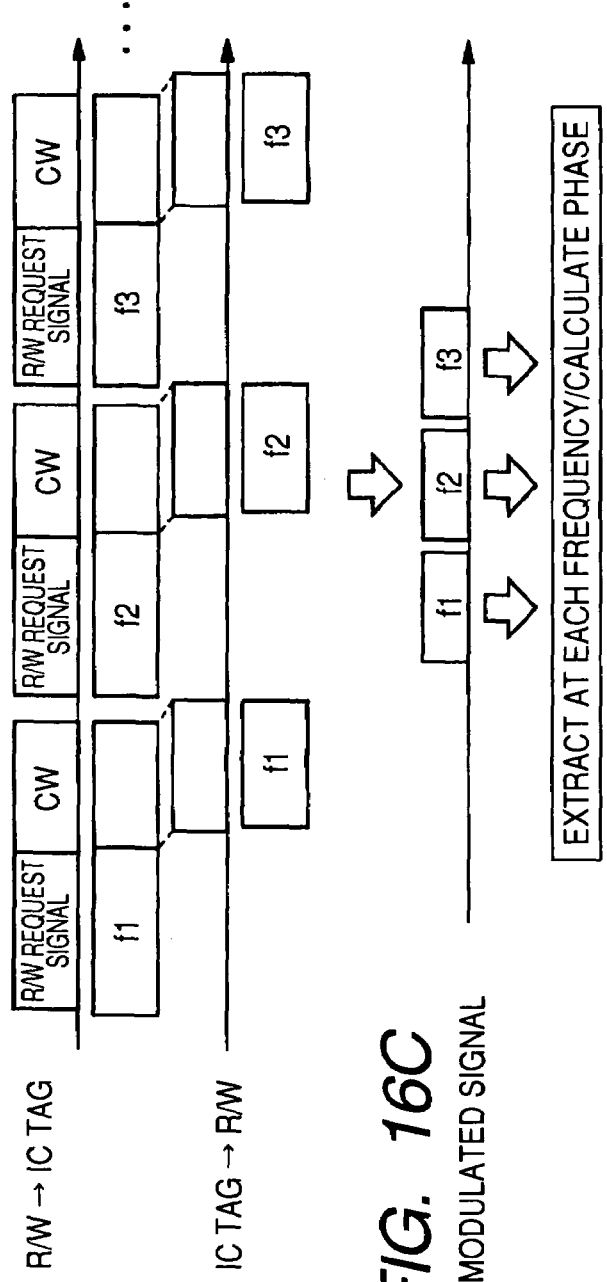

RFID TAG DISTANCE MEASURING SYSTEM AND READER

BACKGROUND OF THE INVENTION

1. Field of the Invention

The present invention relates to an RFID tag distance measuring system and a reader by which a distance between a reader and a Radio Frequency IDentification (RFID) tag can be measured and, in particular, an RFID tag distance measuring system and a reader by which a distance between a reader and an RFID tag can be securely measured.

2. Description of the Related Art

A conventional reader by which a distance from an RFID tag can be measured is disclosed in EP1239634 (Patent Document 1), for example. Patent Document 1 includes using the fact that the phase of a reflected wave from an RFID tag in response to a carrier signal from a reader depends on the distance between the reader and the RFID tag, demultiplexing the reflected wave into an I-signal and a Q-signal having phases identical to and orthogonal to that of the carrier signal, calculating the magnitude and phase of the reflected wave from the RFID tag, and calculating the distance from the RFID tag based on the phase.

Patent Document 1: EP1239623 (seventh column and FIG. 3, for example)

The construction has been adopted in a conventional reader by which a distance from an RFID tag can be measured. When the reader only receives a reflected wave directly from an RFID tag, the distance between the reader and the RFID tag can be measured by using the method disclosed in Patent Document 1. However, in reality, reflected waves from the RFID tag may include not only direct waves but also waves through paths reflected by a wall, a ceiling and so on. In other words, the reflected waves from an RFID tag may follow many paths (the environment of which is called multipath environment). In such a multipath environment, most reflected waves may not be received from an RFID tag even by transmitting signals at multiple different frequencies to the RFID tag in order to calculate the distance to the RFID tag. However, the point has not been considered in the past.

SUMMARY OF THE INVENTION

Accordingly, the invention was made in view of the problem, and it is an object of the present invention to provide an RFID tag distance measuring system and reader by which the distance to an RFID tag can be measured with high precision in a multipath environment.

According to one aspect of the invention, there is provided an RFID tag distance measuring system including an RFID tag and a reader that outputs a predetermined carrier signal to the RFID tag and receives a reflected signal of the carrier signal from the RFID tag, wherein the system estimates the distance between the RFID tag and the reader. The reader has signal output means for outputting signals at multiple frequencies, which are different from each other, as the carrier signal, a transmitting section that transmits a signal output by the signal output means to the RFID tag, a receiving section that receives reflected signals of the signals at multiple frequencies, which are different from each other, from the RFID tag, and estimating means for estimating the distance between the RFID tag and the reader based on the amount of change in phase between the reflected signals received by the receiving section and the carrier signals and the frequencies of the carrier signals, and the transmitting section and the receiving section have diversity means for obtaining multiple receive signals in which the strengths of the reflected signals vary differently when the receiving section receives the reflected signals.

In order to estimate the distance between the RFID tag and the reader, a strong reflected signal can be selectively obtained by using the diversity means for obtaining multiple receive signals the reflected signals of which have strengths varying differently.

As a result, an RFID tag distance measuring system can be provided which can securely measure the distance to an RFID tag since the number of field holes (each of which is an area where communication is not available) can be reduced in a multipath environment.

Preferably, the multiple frequencies, which are different from each other, of the carrier signals have equal intervals.

Further preferably, the RFID tag distance measuring system further includes multiple transmit antennas connected to the transmitting section and mounted at mutually different positions, and multiple receive antennas connected to the receiving section and mounted at mutually different positions. The diversity means has antenna selection means for selecting a pair of transmit and receive antennas to transmit and receive signals from the multiple transmit antennas and multiple receive antennas.

The antenna selection means may switch to another pair of antennas if the receiving section may not receive signals from the RFID tag at a part of the multiple frequencies by using the selected pair of transmit antenna and receive antenna and retransmits the signals at the multiple frequencies to the RFID tag. The antenna selection means may switch to another pair of antennas if the receiving section may not receive signals from the RFID tag at a part of the multiple frequencies by using one antenna and retransmit the signals at the part of the frequencies that have not been received to the RFID tag.

The diversity means may be a scan antenna.

Preferably, the RFID tag distance measuring system includes scan antenna control means for controlling the receiving section to receive reflected waves from the RFID tag of the signals at the mutually different multiple frequencies, which are transmitted through the scan antenna.

The scan antenna control section may switch to another scan pattern if the receiving section may not receive signals from the RFID tag at a part of the multiple frequencies by using one scan pattern and retransmit signals at the multiple frequencies to the RFID tag. The scan antenna control section may switch to another scan pattern if the receiving section may not receive signals from the RFID tag at a part of the multiple frequencies by using one scan pattern and retransmit signals at the part of the multiple frequencies to the RFID tag.

In this case, the diversity means may include polarized wave output means for outputting multiple different polarized waves.

Preferably, the polarized wave output means has polarized wave output control means for controlling the receiving section to receive reflected waves from the RFID tag of the signals at the mutually different multiple frequencies, which are transmitted from the transmitting section.

Further preferably, the polarized wave output control means switches to polarized waves in another pattern if the receiving section may not receive signals from the RFID tag of a part of signals at the multiple frequencies by the transmitting section and retransmits signals at the multiple frequencies to the RFID tag.

According to another aspect of the invention, there is provided a reader that outputs a predetermined carrier signal to an RFID tag and receives a reflected signal of the predetermined carrier signal from the RFID tag, the reader including signal output means for outputting signals at multiple frequencies, which are different from each other, as the carrier signal, a transmitting section that transmits a signal output by the signal output means to the RFID tag, a receiving section that receives reflected signals of the signals at multiple frequencies, which are different from each other, from the RFID tag, and estimating means for estimating the distance between the RFID tag and the reader based on the amount of change in phase between the reflected signals received by the receiving section and the carrier signals and the frequencies of the carrier signals, and the transmitting section and the receiving section have diversity means for obtaining multiple receive signals in which the strengths of the reflected signals vary differently when the receiving section receives the reflected signals.

Preferably, the multiple frequencies, which are different from each other, have equal intervals.

BRIEF DESCRIPTION OF THE DRAWINGS

FIGS. 2A, 2B and 2C are schematic diagrams showing a communication state between the reader/writer and an RFID tag according to the first embodiment of the invention;

FIGS. 3A and 3B are flowcharts showing operations by the reader/writer according to the first embodiment of the invention;

FIGS. 12A to 12C are schematic diagrams showing communication states between a reader/writer according to a third embodiment of the invention and an RFID tag;

FIGS. 16A to 16C are schematic diagrams showing communication states between the reader/writer according to the fourth embodiment of the invention and an RFID tag.

DESCRIPTION OF THE PREFERRED EMBODIMENTS

First Embodiment (i) System Configuration

Figure 1:
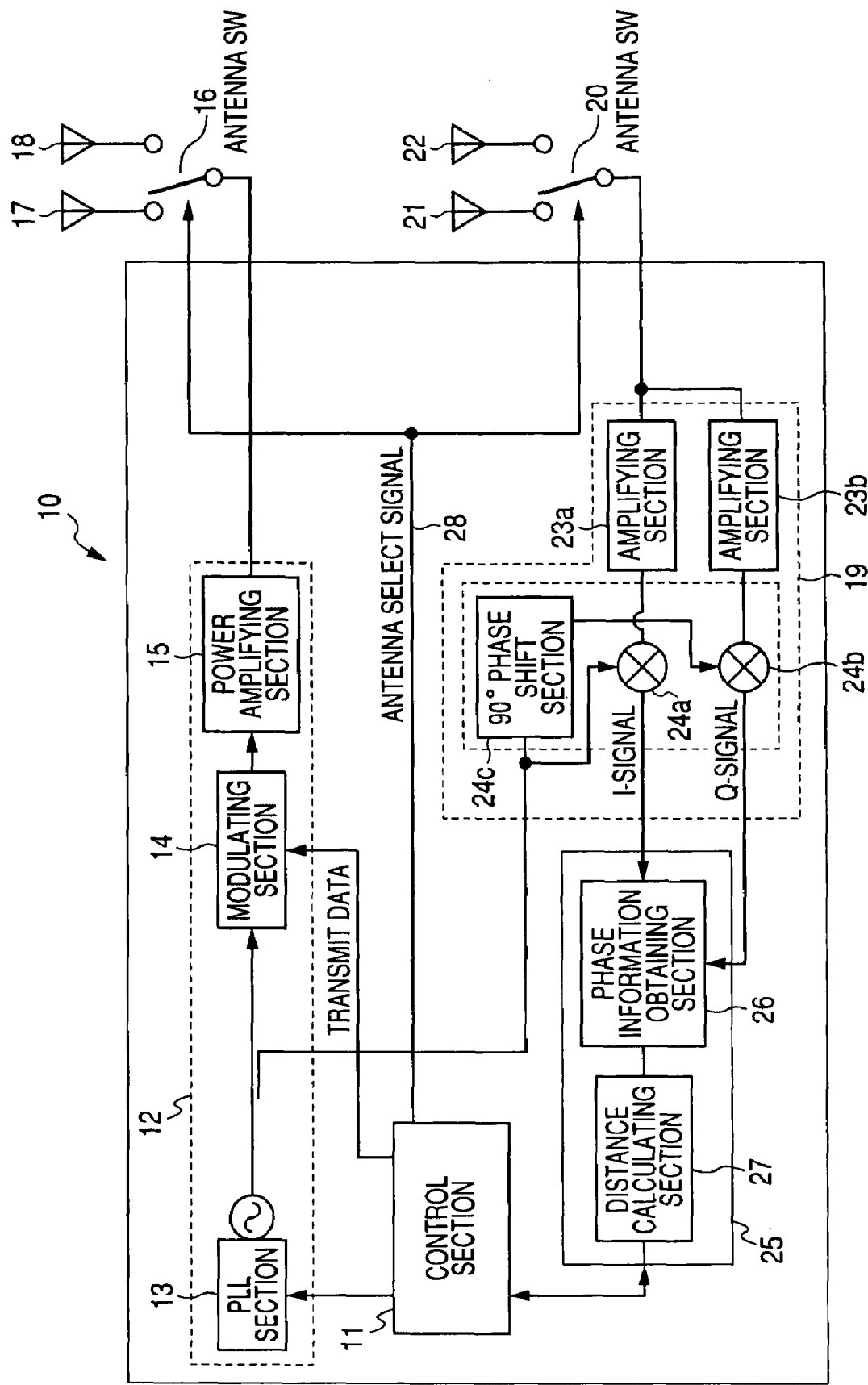
FIG. 1 is a block diagram showing a main part of a reader/writer according to a first embodiment of the invention.

With reference to drawings, an embodiment of the invention will be described below. FIG. 1 is a diagram showing a configuration of a first embodiment of a reader/writer for use in an RFID tag distance measuring system according to the invention. The reader/writer estimates a distance to an RFID tag by outputting a predetermined carrier signal to the RFID tag in a multipath environment.

In order to receive reflected signals from the RFID tag securely in a multipath environment, the reader/writer according to this embodiment has a diversity unit for receiving multiple signals the reflected signals from the RFID tag of which have strengths varying differently. According to this embodiment, the diversity unit has multiple antennas. Here, the reader/writer is used, for example, but a reader may be used without a writing function.

Referring to FIG. 1, a reader/writer 10 includes a control section 11, a transmitting processing section 12, first and second transmit antennas 17 and 18, first and second receive antenna 21 and 22, a receiving processing section 19, and a phase calculation/comparison distance estimating section (estimating unit) 25. The control section 11 controls the entire reader/writer 10 and creates transmit data and controls communication. The transmitting processing section 12 is connected to the control section 11. The first and second transmit antennas 17 and 18 are transmitting units connecting to the transmitting processing section 12. The first and second receive antennas 21 and 22 are receiving units for receiving reflected signals from an RFID tag. The receiving processing section 19 performs a predetermined process on signals received by the first and second receive antennas 21 and 22. The phase calculation/comparison distance estimating section (estimating unit) 25 is connected to the receiving processing section 19. The transmitting processing section 12 includes a PLL (Phase Lock Loop) section 13, a modulating section 14 and a power amplifying section 15. The PLL section 13 sends carrier signals in response to a command from the control section 11. The modulating section 14 is connected to the PLL section 13 and modulates transmit data created by the control section 11. The power amplifying section 15 is connected to the modulating section 14 and amplifies modulated signals. A transmit antenna selection switch 16 is further provided for switching between the first and second transmit antennas 17 and 18 as an antenna for transmitting the transmit data amplified by the power amplifying section 15 to an RFID tag. A receive antenna selection switch 20 is also provided for switching between the first and second receive antennas 21 and 22.

The receiving processing section 19 includes amplifying sections 23a and 23b and a frequency converting section 24 (including mixers 24a and 24b and 90° phase shifting section 24c, which will be described later). The amplifying sections 23a and 23b divide receive signals from the receive antennas 21 and 22 into two and amplify them. The frequency converting section 24 is connected to each of the amplifying sections 23a and 23b and performs processing of converting the frequency of the receive signal amplified in the amplifying section 23a or 23b to a signal at a lower frequency.

The phase calculation/comparison distance estimating section 25 includes a phase information obtaining section 26 and a distance calculating section 27. The phase information obtaining section 26 receives signals from the frequency converting section 24. The distance calculating section 27 calculates the distance from an RFID tag based on the phase information obtained by the phase information obtaining section 26.

When carrier signals are transmitted by the first transmit antenna 17, the reflected signals are received by the first receive antenna 21. When carrier signals are transmitted by the second transmit antenna 18, the reflected signals are received by the second receive antenna 22. The ends of the first and second transmit and receive antennas are positioned differently for obtaining a diversity effect.

The control section 11, PLL section 13 and modulating section 14 are included in a signal output unit that outputs signals at mutually different multiple frequencies as carrier signals. The control section 11 functions as an antenna selection unit that transmits an antenna selection signal 28 for switching mutually between the transmit antennas 17 and 18 and the receive antennas 21 and 22 to the respective antenna selection switches 16 and 20.

(ii) Distance Measuring Method

Next, the construction for measuring the distance between an RFID tag and the reader/writer 10 in the reader/writer 10 will be described with reference to FIG. 1.

In the transmitting processing section 12, the PLL section 13 defines a carrier frequency for transmit signals to be transmitted from the transmit antenna 17 or 18 and includes a PLL circuit. The modulating section 14 performs processing of modulating carrier signals generated by the PLL section 13 and an oscillator and superposing the data over transmit signals. According to this embodiment, the modulating section 14 generates transmit signals by ASK (Amplitude Shift Keying) modulation. The modulating scheme for transmit signals is not limited to the ASK modulation, but other digital modulation schemes may be adopted such as FSK (Frequency Shift Keying) modulation and PSK (Phase Shift Keying) modulation. The power amplifying section 15 amplifies transmit signals.

In the phase calculation/comparison distance estimating section 25, the phase information obtaining section 26 detects an amount of change in phase of a receive signal, which has been frequency-converted by the frequency converting section 24 and obtains it as phase information. The amount of change in phase of a receive signal refers to an amount of change in phase caused when the receive signal is propagated by a predetermined distance.

More specifically, when a carrier signal output from the PLL section 13 is sin $2\pi f1t$, the frequency converting section 24 transmits to the phase information obtaining section 26 the value (D(t)Acos $\phi$) resulting from the multiplication of the carrier signal sin $2\pi f1t$ and the receive signal D(t)A sin ($2\pi f1t+\phi$) input from the amplifying section 23a or 23b. The phase information obtaining section 26 calculates the amount of change $\phi$ in phase based on the value transmitted from the frequency converting section 24. Here, t is a time, D(t) is a baseband signal when ASK modulation is performed in the modulating section 14, A is an amplitude of the carrier signal itself, and $\phi$ is an amount of change in phase due to the propagation by a reciprocating distance of 2 r.

The distance calculating section 27 calculates the distance between a target RFID tag and a reader/writer 10 based on the amount-of-change-in-phase information obtained by the phase information obtaining section 26. The details of the distance calculating method will be described later.

The control section 11 controls the frequency of the carrier signals defined by the PLL section 13 and inputs data the transmit signals of which are to be modulated to the modulating section 14.

Next, the details of the distance measuring method will be described. In this embodiment, as described later, the reader/writer 10 transmits an R/W request signal (or request signal) to a target RFID tag, and the RFID tag returns the response signal (reflected signal) in response thereto.

The reader/writer 10 always transmits specific signals (that is, signals for supplying power to the RFID tag). Furthermore, in order to request a response signal (called tag response signal hereinafter) to the RFID tag, the reader/writer 10 transmits an R/W request signal that requests to return the tag response signal. In other words, the transmitting processing section 12 in the reader/writer 10 controls the modulating section 14 at a steady state to transmit data indicating the steady state and controls the modulating section 14 to transmit data included in the R/W request signal in order to request a tag response signal. The RFID tag always monitors signals transmitted from the reader/writer 10 and, when the reception of the R/W request signal is detected, transmits a tag response signal in response thereto.

More specifically, the reader/writer 10 transmits signals in one frame having an R/W request signal and a CW (Continuous Wave), which will be described later. When the RFID tag receives the R/W request signal and the CW from the reader/writer 10, the RFID tag transmits the tag response signal having a carrier frequency f1 depending on the frequency of the CW to the reader/writer 10. For example, the R/W request signal and CW (Continuous Wave) are transmitted by the carrier frequency f1, and the tag response signal is transmitted by the carrier frequency f1 in accordance therewith.

The tag response signal includes a frame having a preamble part and a data part. The preamble part contains data indicating the beginning of a tag response signal and is predetermined data, which is common to all RFID tags under a same standard (such as EPC). The data part is transmitted subsequently to the preamble part and contains data indicating substantial information to be transmitted from an RFID tag. The information included in the data part may be ID information unique to each RFID tag, for example, but may contain information to be transmitted from an RFID tag such as information stored in a storage section within an RFID tag.

The reader/writer 10 transmits an R/W request signal twice and differentiates the carrier frequencies for the transmissions of the R/W request signals (more specifically, CW after the R/W request signals). In other words, the control section 11 in the reader/writer 10 controls the PLL section 13 to output a carrier signal at a first frequency f1 for transmitting the first R/W request signal and controls the PLL section 13 to output a carrier signal at a second frequency f2, which is different from the first frequency f1, for transmitting the second R/W request signal.

In other words, when an RFID tag receives the R/W request signal transmitted at the first frequency f1, a tag response signal is also returned at the first frequency f1. Then, in the reader/writer 10, the phase information obtaining section 26 detects $\phi1$, which indicates the amount of change in phase of the tag response signal, by analyzing the preamble part of the received tag response signal. In the same manner, when an RFID tag receives the R/W request signal transmitted at the second frequency f2, the tag response signal is also returned at the second frequency f2. In the reader/writer 10, the phase information obtaining section 26 detects $\phi2$, which indicates the amount of change in phase of the tag response signal, by analyzing the preamble part of the received tag response signal. The analysis described here refers to processing for detecting the amount of change in phase of a tag response signal.

The amount of change in phase of a tag response signal is detected by analyzing the preamble part in the example above, the invention is not limited thereto. The amount of change in phase including the data part may be detected, or the amount of change in phase may be detected in the data part. However, when the modulation scheme is PSK, it is difficult to detect the amount of change in phase depending on the distance based on the data part the contents of which may vary. The amount of change in phase in the preamble part the contents of which is fixed is preferably detected.

After the phase information obtaining section 26 detects the amounts of change φ1 and φ2 in phase in this way, the information on the amounts of change in phase is transmitted to the distance calculating section 27. The distance calculating section 27 calculates the distance between an RFID tag and the reader/writer 10 based on φ1 and φ2 as follows.

First of all, it is assumed that the distance from one of the transmit antennas 17 and 18 to an RFID tag and the distance from one of the receive antennas 21 and 22 to the RFID tag are equal and that the distance is r. The amounts of change φ1 and φ2 in phase due to the propagation of the signals carried at the first frequency f1 and second frequency f2 by a reciprocating distance of 2 r are:

(1)

where c is the speed of light. Based on EQ1, the distance r can be calculated by:

(2)

In this way, based on the amounts of change φ1 and φ2 in phase, the distance r from the transmit antenna 17 or 18 to the RFID tag can be calculated. Though, a displacement in phase may occur during the period from the reception of R/W request signals to the transmission of the tag response signals in an RFID tag, the displacement in phase is equal in both signals carried at the first frequency f1 and second frequency f2. Thus, the displacement in phase caused upon transmission/reception of signals in an RFID tag has no influence on the distance calculation.

In EQ2, the distance r cannot be calculated properly when φ2 is 2π or higher. In other words, the measurable maximum value rmax of the distance r is obtained when Δφ=2π and is expressed by:

(3)

In this case, when the difference between the first frequency f1 and the second frequency f2 is 5 MHz, for example, the maximum distance rmax is 30 m from EQ3. In the same manner, when the difference between the first frequency f1 and the second frequency f2 is 2 MHz, the maximum distance rmax is 75 m from EQ3. The measurement in this way may have practically no problem since the possible maximum communication distance is in the order of 10 m in an RFID communication system employing the UHF band.

Notably, even when a distance r equal to or longer than the maximum distance rmax must be measured, the distance r can be measured by additionally measuring the received strength of the receive signal. More specifically, when Δφ is possibly equal to or higher than 2π, a candidate r' of the distance r is r'=r+n*rmax (where n is zero or a higher integer). Therefore, the n-value can be specified based on the fact that the received strength of the receive signal decreases as the distance r increases.

When an active type RFID tag is used, the distance may be measured based on a tag response signal actively transmitted from the RFID tag side without the transmission of an R/W request signal from the reader/writer 10 side.

Next, a specific example of the receiving processing section 19 will be described. In the distance measurement above, the processing is performed for detecting amounts of change in phase of receive signals, and the receiving processing section 19 allows the detection of amounts of change in phase. The construction of the receiving processing section 19 will be described in detail with reference to FIG. 1. In the specific example, the receiving processing section 19 demultiplexes receive signals to I-signals and Q-signals and inputs them to the phase calculation/comparison distance estimating section 25. Thus, the receiving processing section 19 allows the processing of detecting amounts of change in phase in the phase calculation/comparison distance estimating section 25. As shown in FIG. 1, the receiving processing section 19 includes, as described above, the two amplifying sections 23a and 23b as an amplifying unit, mixers 24a and 24b and 90° phase shifting section 24c in the frequency converting section 24.

The receive signal received by either receive antenna 21 or 22 is divided for two paths, and one is input to the amplifying section 23a, and the other is input to the amplifying section 23b. The amplifying section 23a amplifies the input receive signal and inputs it to the mixer 24a. The amplifying section 23b amplifies the input receive signal and inputs it to the mixer 24b.

The mixer 24a multiplies the receive signal input from the amplifying section 23a and the carrier signal output from the PLL section 13, thus outputs an I-signal and inputs the I-signal to the phase information obtaining section 26. The mixer 24b multiplies the receive signal input from the amplifying section 23b and the carrier signal output from the PLL section 13 and having the phase changed by 90° through the 90° phase shifting section 24c, thus outputs a Q-signal and inputs the Q-signal to the phase information obtaining section 26.

Details of the receiving processing and processing of calculating the distance r to be performed in the construction above will be described below. A signal propagated by a reciprocating distance of 2 r and received by the reader/writer 10 is expressed by:

(4)

where the frequency of the carrier signal is f1, and t is a time, s1(t) is the state of a signal transmitted by the carrier signal at the frequency f1, D(t) is a baseband signal when ASK modulation is performed in the modulating section 14, A is an amplitude of the carrier signal itself, and φ1 is an amount of change in phase due to the propagation by a reciprocating distance of 2 r. In this case, I1(t) that indicates the state of the I-signal output by the mixer 24a and Q1(t) that indicates the state of the Q-signal output by the mixer 24b are expressed by:

(5)

(6)

The amount of change φ1 in phase of the signal by the carrier signal at the frequency f1 based on the I-signal and Q-signal can be calculated by:

(7)

In the same manner, the amount of change φ2 in phase of the signal by the carrier signal at the frequency f2 can be calculated by:

(8)

In this way, the phase information obtaining section 26 obtains the amounts of change φ1 and φ2 in phase based on the input I-signal and Q-signal. Then, the distance calculating section 27 calculates the distance r by:

(9)

The method for estimating the distance between an RFID tag and the reader/writer 10 is common in all embodiments below.

(iii) Specific System Operations

Next, specific operations of the reader/writer 10 and an RFID tag, not shown, in this embodiment will be described. Having described the case where the distance is calculated by using two frequencies f1 and f2 above, a case will be described below in which three frequencies including not only the frequencies f1 and f2 but also a frequency f3 are used to measure the distance therebetween. It should be noted that the frequencies f1 to f3 are arbitrary frequencies, which are different from each other. In drawings to be described below, the reader/writer 10 is indicated by "R/W" and the RFID tag is indicated by "IC TAG".

FIGS. 2A to 2C are diagrams schematically showing operations by the reader/writer 10 and an RFID tag, not shown. In FIGS. 2A to 2C, "R/W→IC TAG" indicates the transmit data from the reader/writer 10 to the RFID tag, and the direction of the arrow indicates a lapse of time. The part above the arrow indicates the type of the signal, and "f1" and "f2" below indicate the transmit frequencies. On the other hand, "IC TAG→R/W" indicates transmit data from the RFID tag to the reader/writer 10.

Referring to FIGS. 1 and 2A, the reader/writer 10 first outputs the read/write request signal (R/W request signal) at the frequency f1 and transmits a continuous wave CW to the RFID tag by using the first transmit antenna 17. In response thereto, the continuous wave is returned at the frequency f1 from the RFID tag, and the reader/writer 10 receives it. Next, the reader/writer 10 performs the same transmission at the frequency f2. However, no response is returned from the RFID tag this time.

Then, the reader/writer 10 switches the transmit antenna to the second transmit antenna 18 by using the transmit antenna selection switch 16 and performs the same transmission to the RFID tag by using the second transmit antenna 18 this time, as shown in FIG. 2B. It is assumed that responses at all of the three frequencies can be obtained this time. Based on the fact, the reader/writer 10 generates IQ demodulated signals in the frequency converting section 24, extracts them for each of the frequencies, transmits them to the phase calculation/comparison distance estimating section 25 and calculates the distance based on EQ9, as shown in FIG. 2C.

Next, details of the control by the control section 11 in this case will be described. FIGS. 3A and 3B are flowcharts showing details of the control by the control section 11. Referring to FIG. 3A, the reader/writer 10 first transmits a read/write request signal and a continuous wave at the frequency f1 to an RFID tag by using the first transmit antenna 17 (step S11, the term, "step", will be omitted hereinafter). Next, whether a response signal at the frequency f1 has been received or not is determined (S12). If so, the phase calculation/comparison distance estimating section 25 demodulates the IQ orthogonal signals with the reference signal (carrier signal) at the frequency f1 and captures the data (S13) Then, after a predetermined period of time, the frequency f2 is selected, and, in the same manner, a read/write request signal and a continuous wave are transmitted to the RFID tag at the frequency f2, and whether the response signal at the frequency f2 has been received or not is determined (S14 and 15). If so in S15, the orthogonal demodulation is performed with the reference signal at the frequency f2, and the data is captured (S16).

Then, after a predetermined period of time, the frequency f3 is selected, and, in the same manner, a read/write request signal and a continuous wave are transmitted to the RFID tag at the frequency f3, and whether the response signal at the frequency f3 has been received or not is determined (S17 and 18). If so in S18, the orthogonal demodulation is performed with the reference signal at the frequency f3, and the data is captured (S19). As shown in FIG. 2B, when the reflected signals of the signals at all of the three frequencies are obtained in this way, the phase calculation/comparison distance estimating section 25 calculates the phase differences from the IQ orthogonal signals at the frequencies f1 to f3 and calculate the distance to the RFID tag based on EQ9 (S20 and S21), as shown in FIG. 2C.

As shown in FIG. 2A, when the response signal has not been received at the frequency f1, f2 or f3 from the RFID tag in one of S12, S15 and S18, the second transmit antenna 18 is selected, and the processing returns to S11. Then, the same processing is performed by using the second transmit antenna 18.

As described above, the distance from an RFID tag can be securely obtained according to this embodiment since multiple receive signals the strengths of which vary differently are obtained when the reflected signals are received from an RFID tag by using multiple transmit/receive antennas. Furthermore, the precision of the measurement can be increased since the distance is estimated by obtaining the phase differences among three frequencies.

Figure 4:
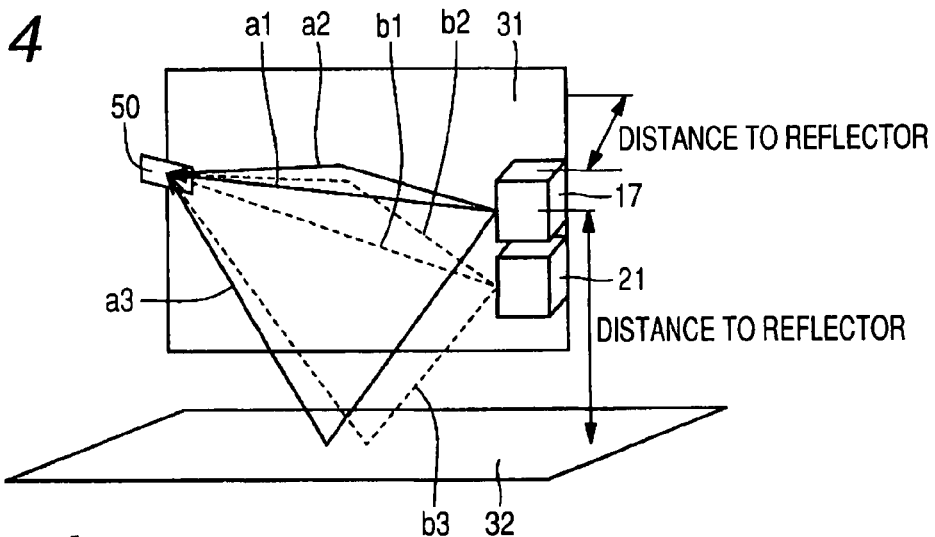
FIG. 4 is a diagram showing a simulation environment using the reader/writer according to the first embodiment of the invention.
Figure 5A:
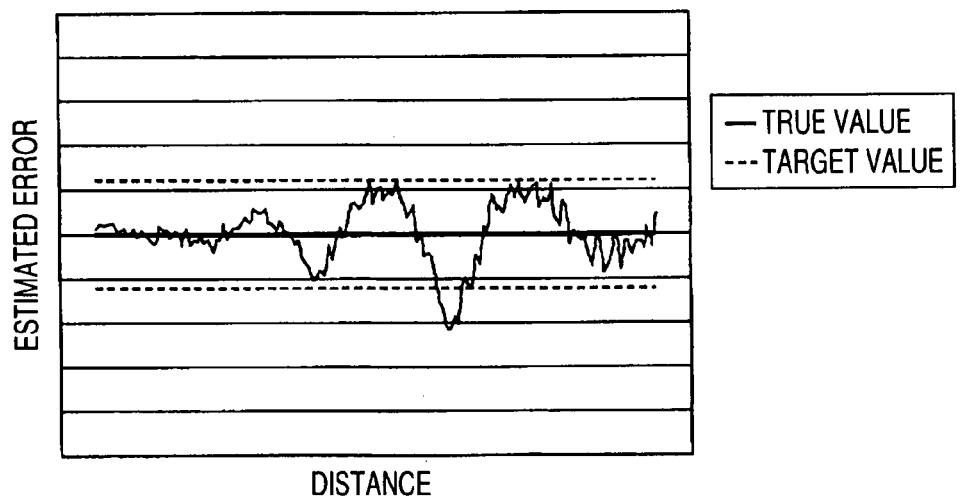
FIGS. 5A and 5B are diagrams showing results of estimation of distances to the RFID tag when the reader/writer according to the first embodiment of the invention is used.
Figure 5B:
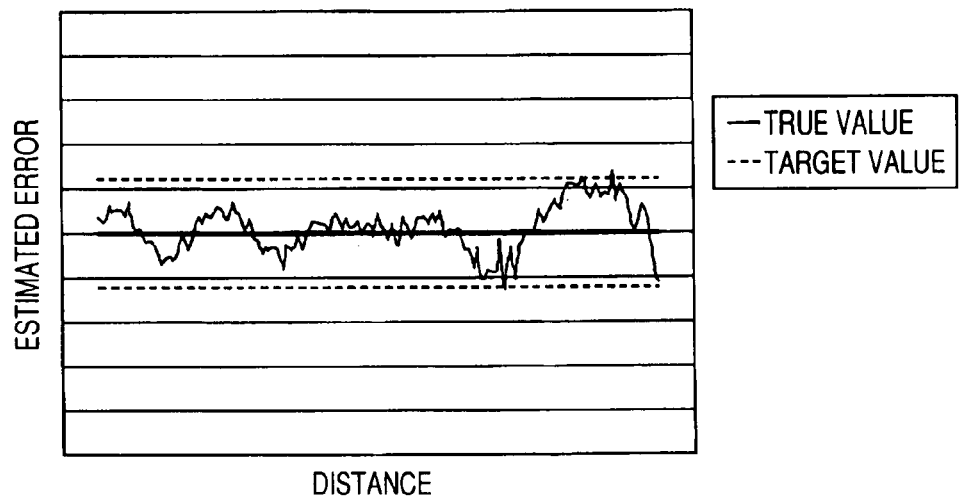

Next, a simulation result in this case will be described. FIGS. 4 and 5A and 5B are diagrams showing a simulation condition and the results in a multipath environment by using the multiple, that is, first and second transmit and receive antennas. As shown in FIG. 4, a simulation was performed in which transmission and reception were performed between two transmit and receive antennas (among which the transmit antenna 17 and receive antenna 21 are only shown) and an RFID tag 50 by using three waves of direct waves (indicated by "a1" and "b1"), waves (indicated by "a2" and "b2") reflected by a reflector (wall surface) 31 on one side, and waves (indicated by "a3" and "b3") reflected by a reflector (floor surface) 32 on the bottom surface. The results are shown in FIGS. 5A and 5B.

FIG. 5A is a diagram showing a relationship between the distance and estimated errors between the reader/writer 10 and the RFID tag by using the first transmit and receive antennas 17 and 21. FIG. 5B is a diagram showing a relationship between the true values and target values of the distance and the estimated errors between the reader/writer 10 and the RFID tag by using the second transmit and receive antennas 18 and 22. As shown in FIGS. 5A and 5B, using one frequency can provide data having different characteristics but it can be seen that similar estimated values close to the true values can be obtained in all cases. It also can be seen that similar results can be obtained even by selecting another antenna when partial reflected signals cannot be obtained.

Second Embodiment

Next, a second embodiment of the invention will be described. In this embodiment, a reader/writer has a scan antenna as the diversity means instead of multiple antennas.

Figure 6A:
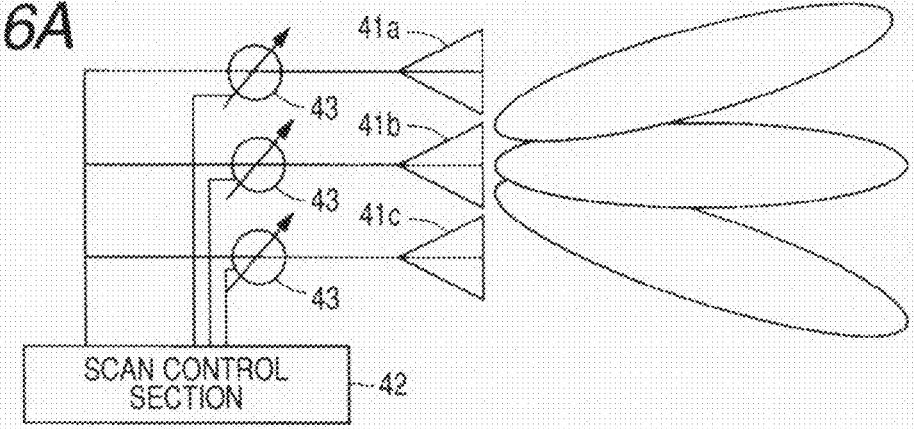
FIGS. 6A to 6C are diagrams showing a main part of a reader/writer according to a second embodiment of the invention and distributions of electric field strengths in that case.
Figure 6B:
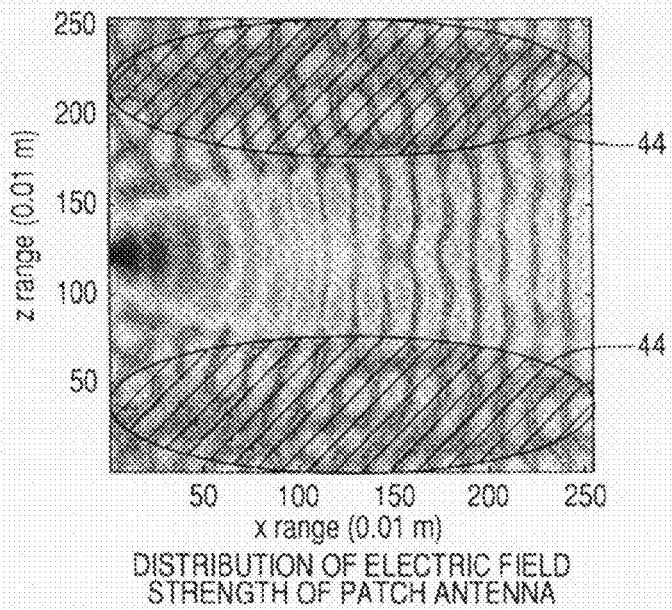
Figure 6C:
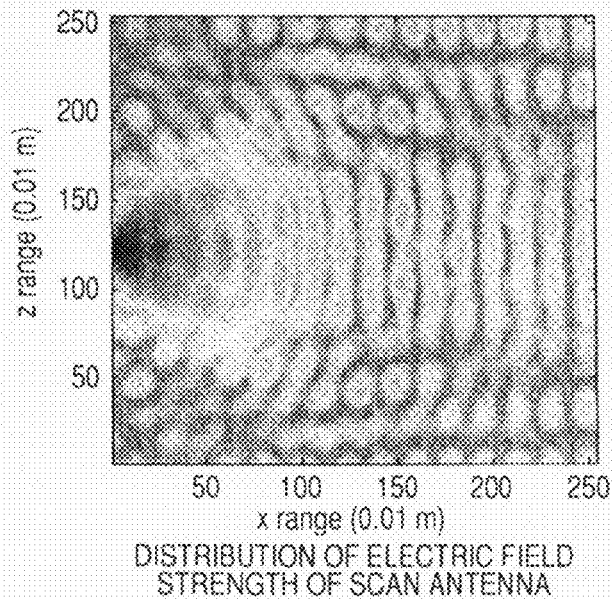

FIGS. 6A to 6C are diagrams for describing the scan antenna. FIG. 6A is a diagram schematically showing the scan antenna. As shown in FIG. 6A, the scan antenna has multiple antenna elements 41*a* to 41*c* and can change the antenna's directivity by controlling the phase differences among signals to be supplied to the antenna elements 41a to 41c by using a phase shifter 43 through a scan control section 42.

Next, characteristics of the scan antenna will be described. FIG. 6B is a diagram showing a distribution of electric field strengths of a normal patch antenna. FIG. 6C is a diagram showing a distribution of electric field strengths of the scan antenna. In the figures, field holes (each of which is an area where communication is not available) 44 are shaded. The patch antenna causes many field holes 44 where the communication with an RFID tag is not available due to the influence of the multipath, but the scan antenna does not cause such a state.

Figure 7:
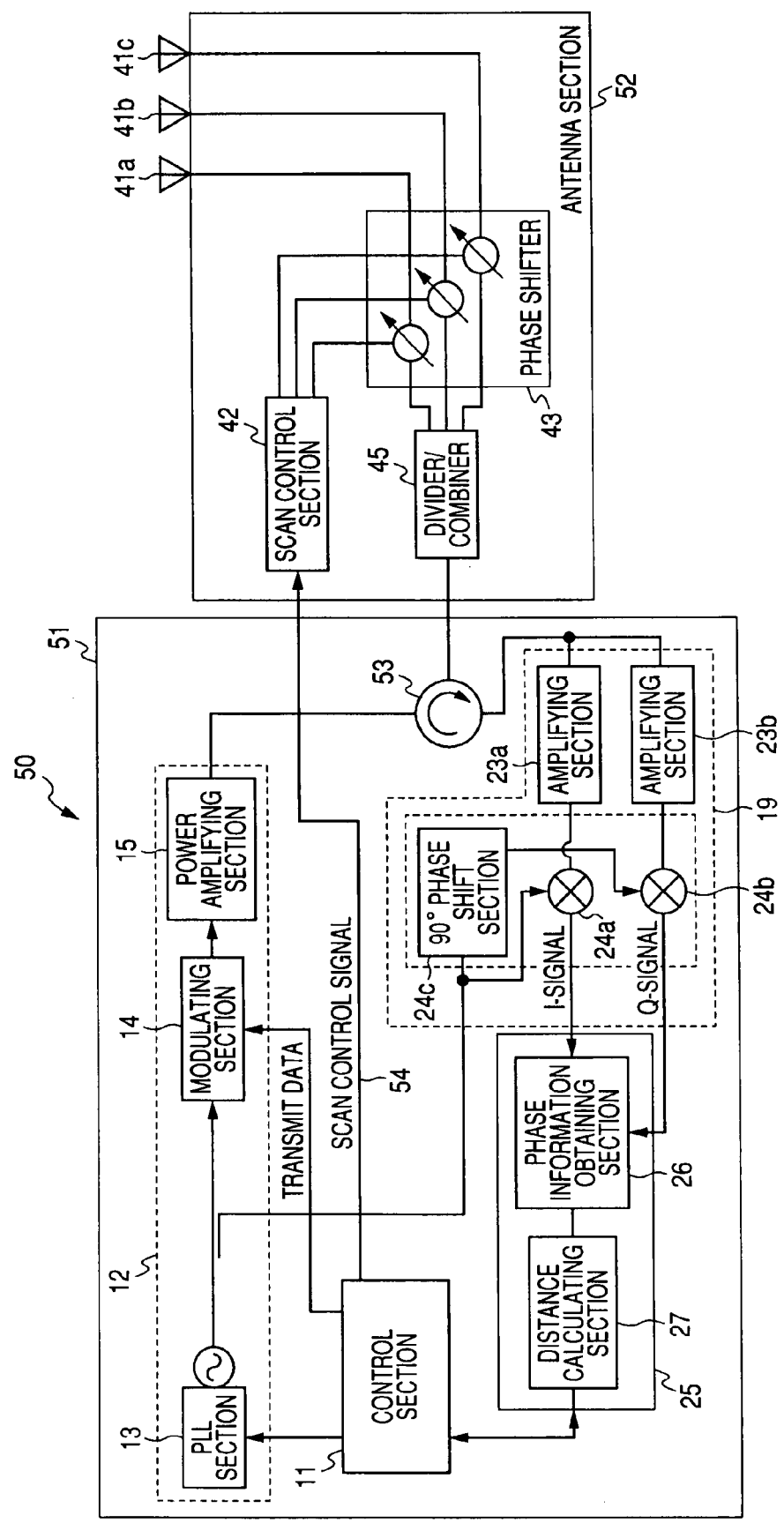
FIG. 7 is a block diagram showing the main part of the reader/writer according to the second embodiment of the invention.

A reader/writer in this embodiment is shown in FIG. 7. Referring to FIG. 7, a reader/writer 50 includes a reader/writer body 51 and an antenna section 52 that operates as the diversity means. The reader/writer body 51 has basically the same construction as that of the first embodiment in FIG. 1 except that a circular 53 for using one antenna section 52 for both transmission and reception is provided and that the control section 11 transmits a scan control signal to a scan control section for changing the antenna's directivity. Therefore, the same reference numerals are given to the same components, and the description will be omitted.

The antenna section 52 includes a scan control section 42, the multiple antenna elements 41a to 41c, the phase shifter 43, and a divider/combiner 45. The phase shifter 43 changes phase differences among signals to be supplied to the multiple antenna elements 41a to 41c under the control of the scan control section 42. The divider/combiner 45 is provided between the circular 53 and the phase shifter 43 and divides radio waves for transmission to the antenna elements 41 and combines radio waves received by the antenna elements 41.

Here, the control section 11, scan control section 42 and phase shifter 43 function as the scan antenna control means.

Figure 8A:
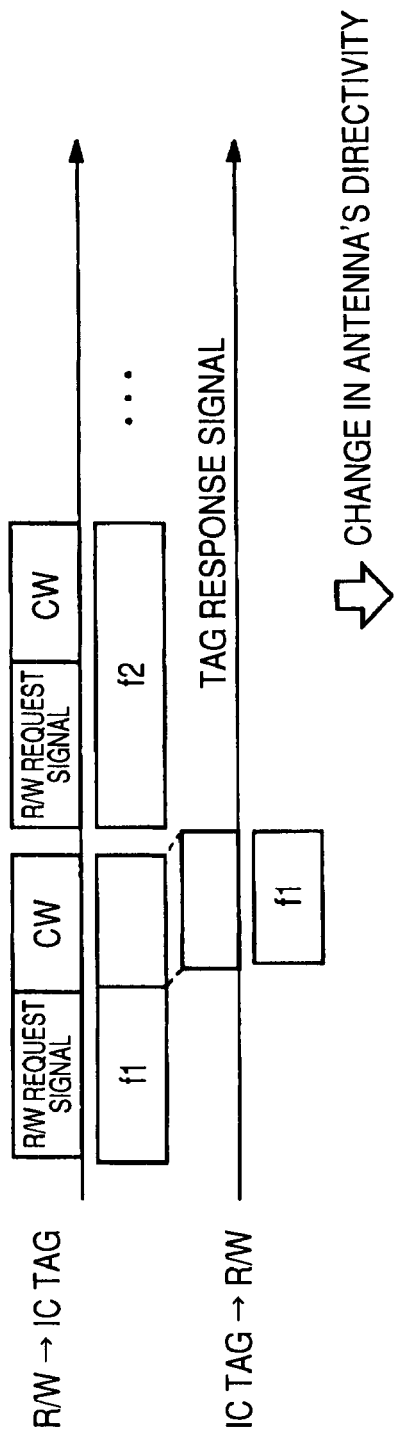
FIGS. 8A to 8C are schematic diagrams showing communication states between the reader/writer according to the second embodiment of the invention and an RFID tag.
Figure 8B:
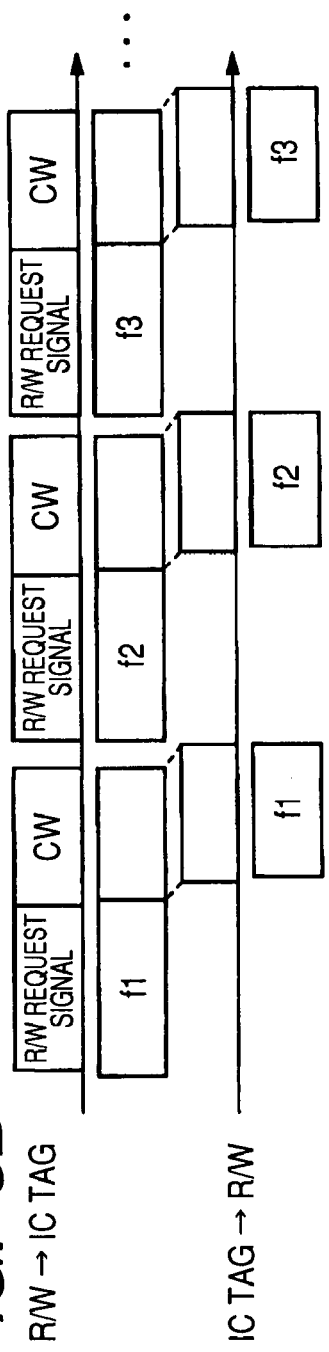
Figure 8C:
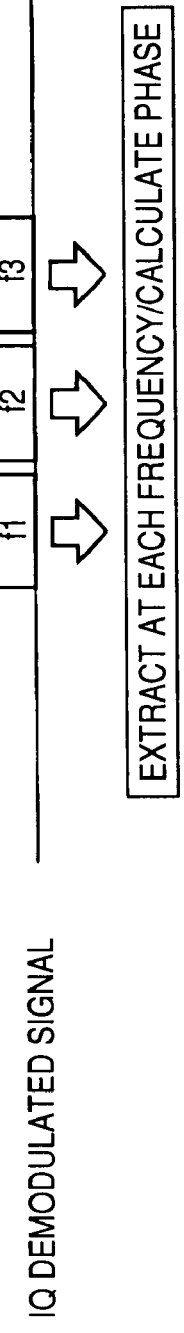

Next, operations of the reader/writer 50 and an RFID tag, not shown, in this case will be described. Here, a case in which the distance measurement is performed by using three frequencies as in the first embodiment will be described. FIGS. 8A to 8C are diagrams according to this embodiment, which correspond to FIGS. 2A to 2C according to the first embodiment.

Referring to FIGS. 8A to 8C, the basic operations in this embodiment is the same as those of the first embodiment except that the directivity of the scan antenna is changed according to this embodiment instead of that multiple antennas are switched according to the first embodiment when a response is not obtained from an RFID tag. In other words, as shown in FIG. 8A, the directivity of the antenna section 52 is changed when the reflected signal from an RFID tag is not obtained at the frequency f2, for example. Under this state, when the reflected signals can be obtained at all frequencies as shown in FIG. 8B, the IQ demodulated signals are calculated, and the phase differences are calculated as shown in FIG. 8C to obtain the distance.

Figure 9A:
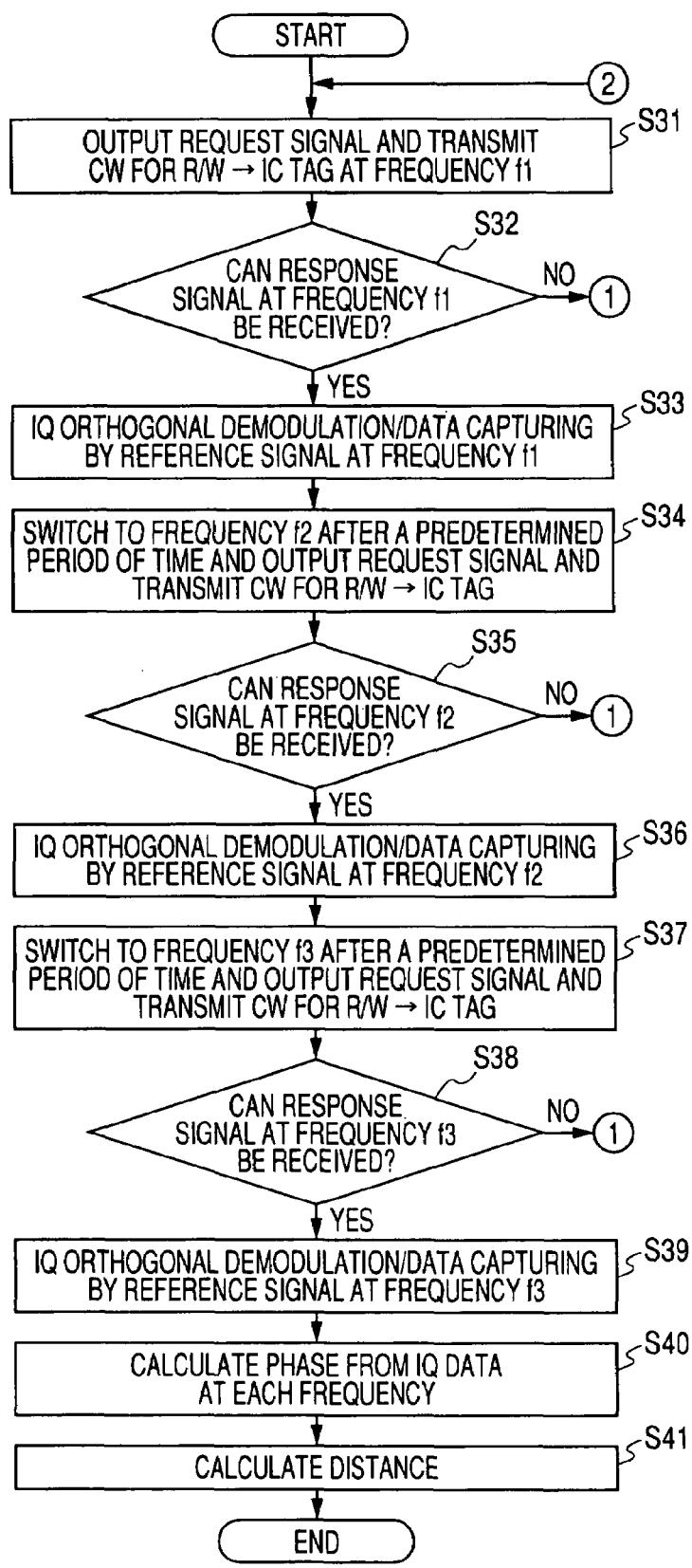
FIGS. 9A and 9B are flowcharts showing operations of the reader/writer according to the second embodiment of the invention.
Figure 9B:
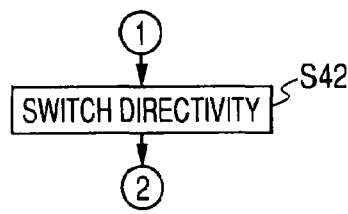

Next, details of the control by the control section 11 in this embodiment will be described. FIGS. 9A and 9B are flowcharts showing details of the control by the control section 11 in the second embodiment. The basic operations of this embodiment are the same as those of the first embodiment. This embodiment is different from the first embodiment in that the directivity of the scan antenna is changed to reduce the number of field holes instead of that multiple antennas are switched when the response is not obtained from an RFID tag. Therefore, the details in S31 to S41 in FIG. 9A are the same as those in FIG. 3A. This embodiment is different from the first embodiment in that the directivity of the scan antenna is changed as in S42 in FIG. 9B when the response signal is received from an RFID tag at the frequencies f1, f2 or f3. Therefore, the description of the details will be omitted.

As described above, according to this embodiment, the distance from an RFID tag can be obtained securely since multiple receive signals the strengths of which vary differently are obtained when the reflected signals are received from the RFID tag by using a scan antenna. The precision of the measurement can be increased since the distance is estimated by obtaining the phase differences among three frequencies.

Figure 10:
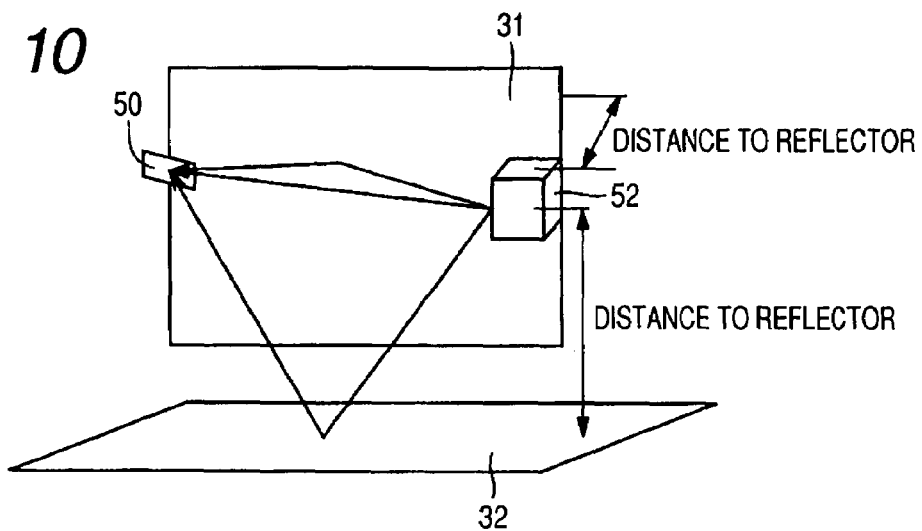
FIG. 10 is a diagram showing a simulation environment using the reader/writer according to the second embodiment of the invention.
Figure 11A:
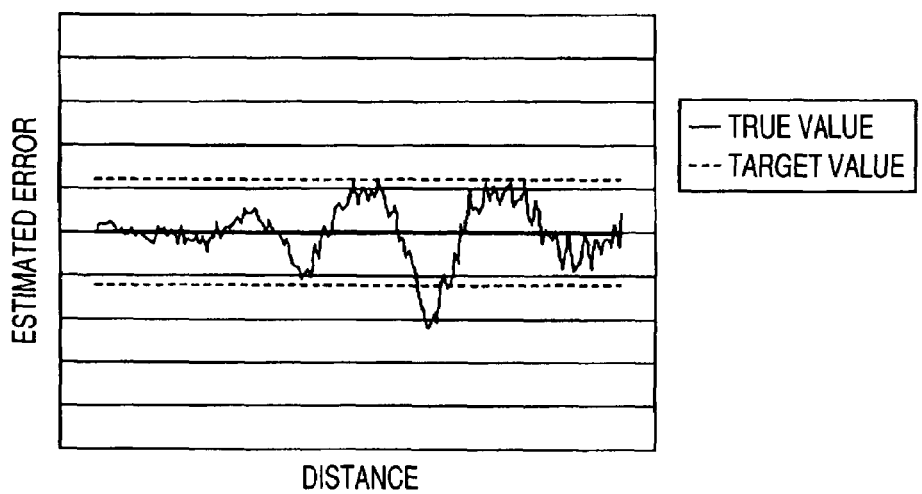
FIGS. 11A and 11B are diagrams showing results of estimation of the distance to the RFID tag when the reader/writer according to the second embodiment of the invention is used.
Figure 11B:
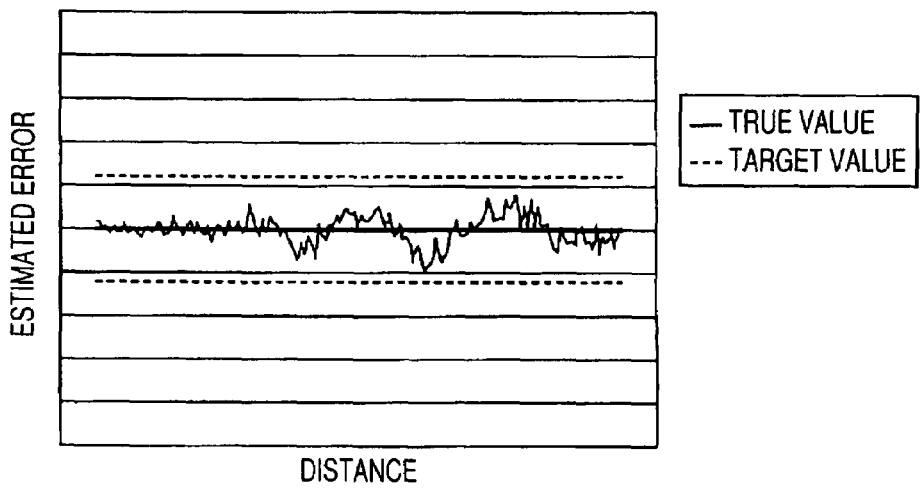

Next, simulation results in this case will be described. FIGS. 10 and 11A and 11B are diagrams showing a simulation condition and the results in a multipath environment by using a scan antenna and correspond to FIGS. 4 and 5A and 5B according to the first embodiment.

Referring to FIG. 10, one antenna section 52 is only shown here since a scan antenna is adopted. A simulation is performed based on a model using three waves of the direct wave between the antenna section 52 and an RFID tag, the reflected wave from a floor surface 32 and the reflected wave from a wall surface 31.

FIG. 11A shows a state before the directivity of the antenna section 52 is changed, and FIG. 11B is a diagram showing a state after the directivity of the antenna section 52 is changed. Referring to FIGS. 11A and 11B, the amplitude of the estimated distance in FIG. 11B is smaller than the amplitude of the estimated distance in FIG. 11A, and the decrease in precision can be improved.

Third Embodiment

Another embodiment of the invention will be described next. In the embodiment above, the control is performed to obtain responses from an RFID tag at all frequencies when a scan antenna is used and the antenna has a certain directivity. On the other hand, the directivity of the antenna is changed according to this embodiment when responses are not obtained at some frequencies. A case using three frequencies will be also described here.

The construction of a reader/writer in this embodiment is the same as that shown in FIG. 7.

FIGS. 12A to 12C according to this embodiment are diagrams corresponding to FIGS. 8A to 8C. Referring to FIG. 12A, though, in this embodiment, reflected signals are received from an RFID tag at the frequencies f1 and f3, no response is received from the RFID tag at the frequency f2.

Accordingly, according to this embodiment, as shown in FIG. 12B, an R/W request signal is also retransmitted at the frequency f2 only at which the response signal has not been received. As shown in FIG. 12C, after reflected signals are received at all frequencies, the IQ demodulated signals are generated by demodulating them, and the phase differences are calculated.

Figure 13:
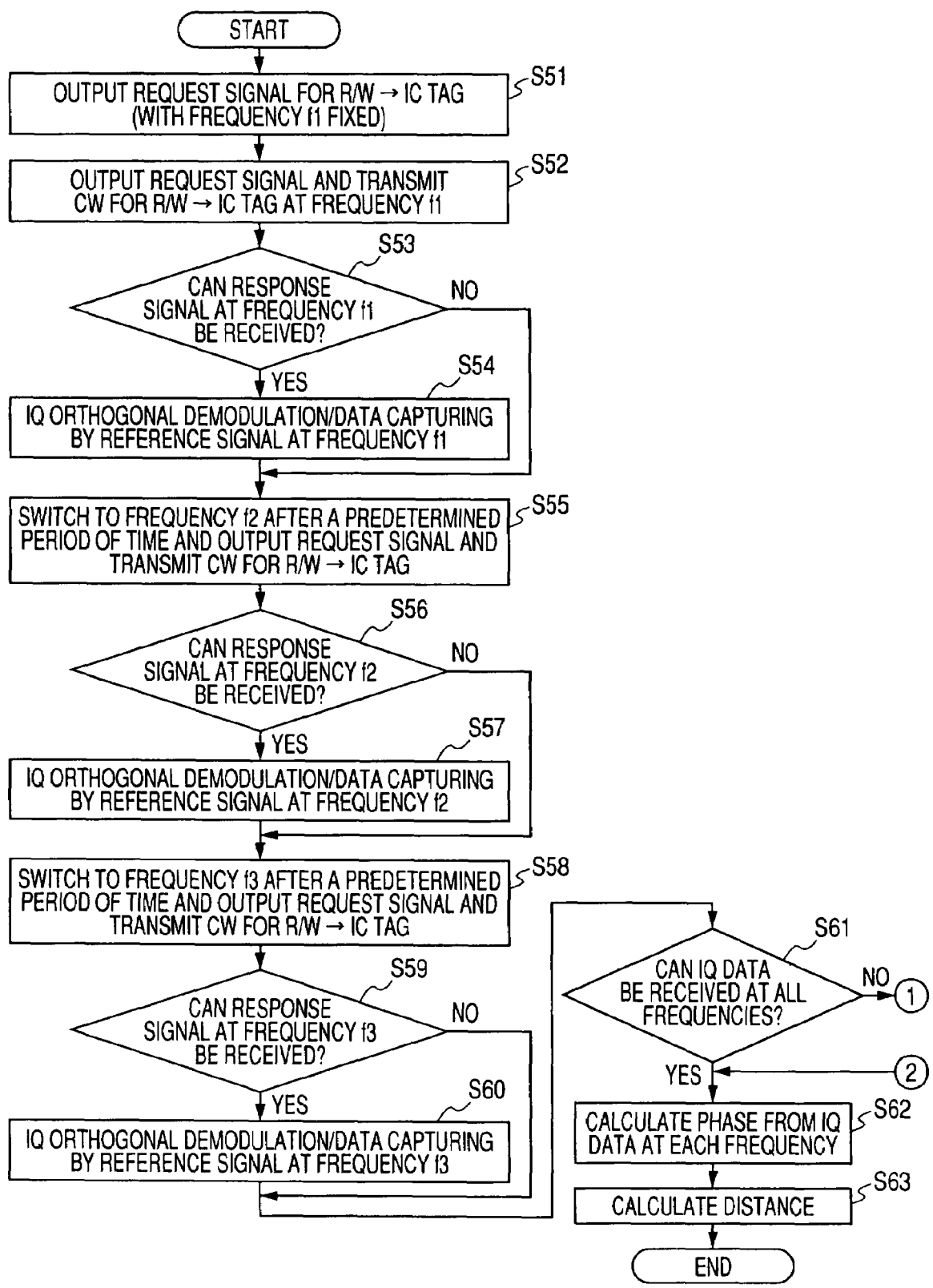
FIG. 13 is a flowchart showing operations of the reader/writer according to the third embodiment of the invention.
Figure 14:
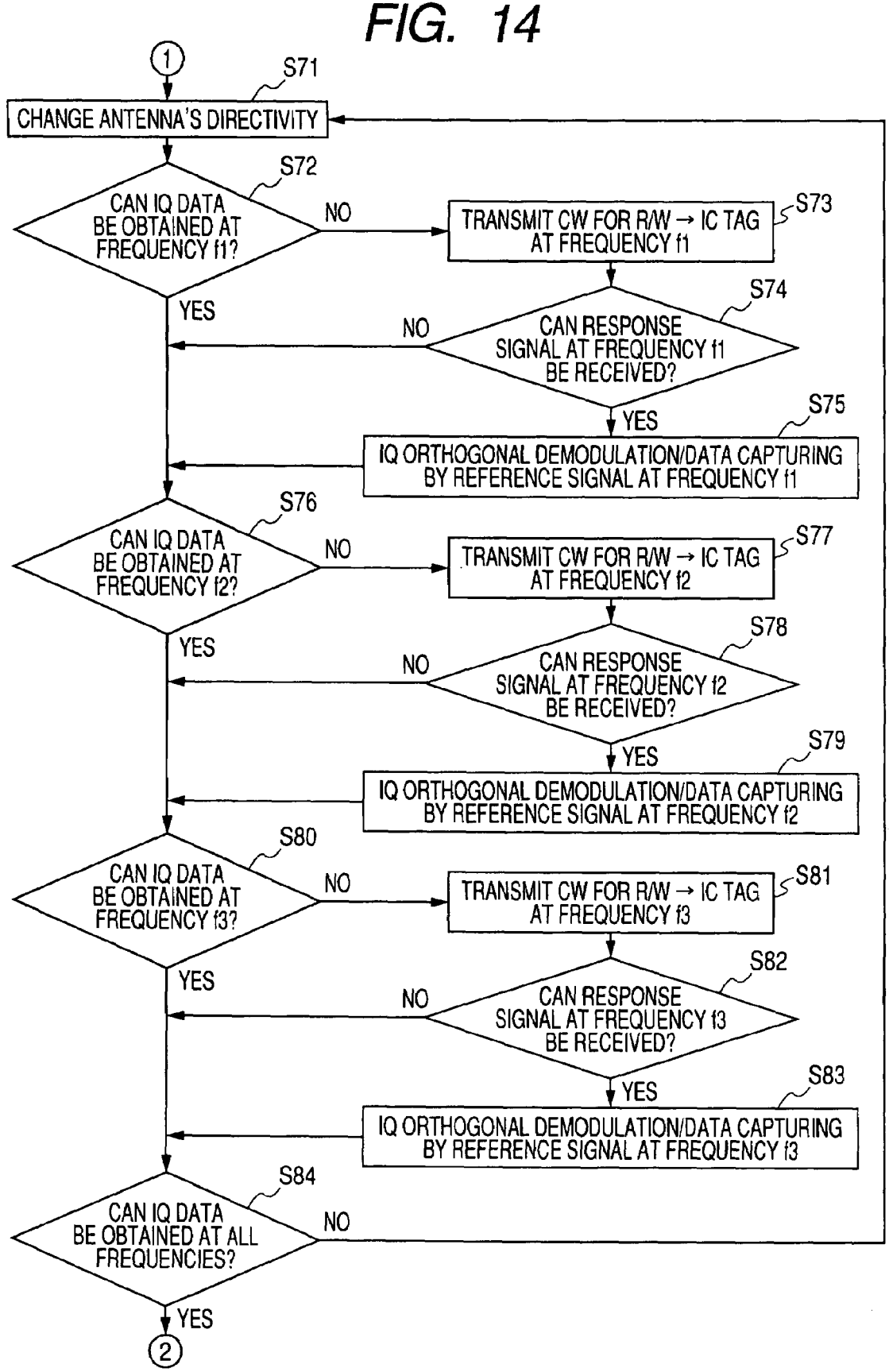
FIG. 14 is a flowchart showing operations of the reader/writer according to the third embodiment of the invention.

FIGS. 13 and 14 are flowcharts showing operations of a reader/writer in this case. Referring to FIGS. 13 and 14, a reader/writer 50 defines a certain directivity and transmits a read/write request signal at the frequency f1 from the antenna section 52 to an RFID tag (S51). In this embodiment, the frequency to be used for the first transmission is fixed at f1. Next, a continuous wave is transmitted (S52). After that, whether the response signal at the frequency f1 has been received or not is determined (S53). If so, IQ orthogonal signals are demodulated with the reference signal at the frequency f1 in the phase calculation/comparison distance estimating section 25, and the data is captured (S54). After a predetermined period of time, the frequency f2 is selected, and a read/write request signal and a continuous wave are also transmitted to an RFID tag at the frequency f2, and whether the response signal at the frequency f2 has been received or not is determined (s55 and S56). If not in S53, the processing also moves to S55. If so in S56, the orthogonal demodulation is performed with the reference signal at the frequency f2, and the data is captured (S57). Then, after a predetermined period of time, the frequency f3 is selected, and a read/write request signal and a continuous wave are also transmitted to an RFID tag at the frequency f3, and whether the response signal at the frequency f3 has been received or not is determined (s58 and S59). If not in S56, the processing also moves to S58.

If so in S59, orthogonal demodulation is performed with the reference signal at the frequency f3, and the data is captured (S60). If the IQ orthogonal signals are received at all of the frequencies f1 to f3 here (YES in S61), the phase calculation/comparison distance estimating section 25 calculates the phase differences from the data pieces and calculates the distance (S62 and S63). If not in S59, the processing also moves to S61.

If not in S61, the processing moves to S71 in FIG. 14 where the directivity of the antenna section is changed. Then, at which frequency of the frequencies f1 to f3 the IQ data has not been obtained is determined (S72, S76 and S80), and the transmission to the RFID tag is performed (S73, S77 and S81) at the frequency from which the IQ data has not been obtained (NO in S72, S76 and S80). Then, whether the response signal has been received or not is determined (S74, S78 and S82). If so (YES in S74, S78 and S82), the IQ orthogonal demodulation is performed with the reference signal at the frequency, and the data is captured (S75, S79 and S83). If not (NO in S74, S78 and S82), the processing moves to obtaining IQ data at another frequency.

Then, if IQ data has been obtained at all frequencies (YES in S84), the processing moves to S62 where the phase differences are calculated from the IQ data at the frequencies. Then, the distance is calculated in the same manner as above (S63). If the IQ data has not been obtained at all frequencies in S84 (NO in S84), the processing returns to S71.

Fourth Embodiment

Figure 15:
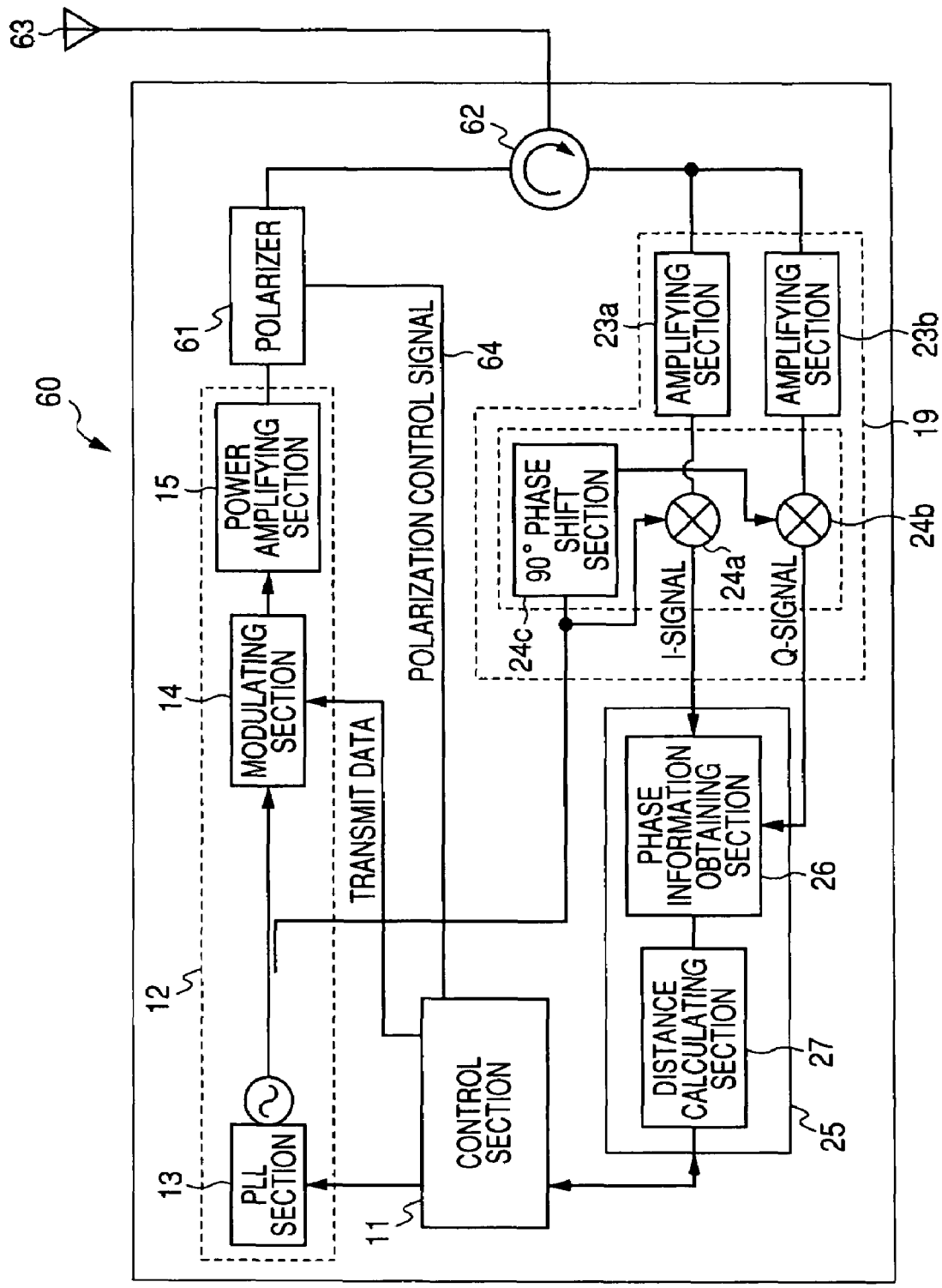
FIG. 15 is a block diagram showing a main part of a reader/writer according to a fourth embodiment of the invention.

Another embodiment of the invention will be described next. FIG. 15 is a block diagram showing a construction of a reader/writer according to this embodiment of the invention. In this embodiment, a reader/writer includes a polarizer that outputs multiple different polarized waves as the diversity means. In other words, the reader/writer has one antenna and outputs signals having different polarization patterns, which are generated by the polarizer, from the antenna to an RFID tag.

By changing the polarizing method, the influences of reflected waves vary in some RFID tags. In other words, even when no response is received from an RFID tag by one polarizing method, the response from the RFID tag can be received by using another polarizing method if multiple polarized waves are used. Then, the distance to the RFID tag can be measured by combining the responses at frequencies, which are received by the polarizing methods.

FIG. 15 is a block diagram showing a reader/writer 60 according to this embodiment. Referring to FIG. 15, the reader/writer 60 in this embodiment is basically the same as that shown in FIG. 1. The reader/writer 60 is different from that in FIG. 1 in that an antenna 63 is only provided instead of the multiple antennas in FIG. 1, and a circular 62 is provided for transmission and reception and in that a polarizer 61 is provided between an power amplifying section 15 and the circular.62 for polarizing a carrier wave in accordance with a polarization control signal 64 from the control section 11. The polarizing method is changed by the polarizer 61 based on a command from the control section 11. Thus, the control section 11 and the polarizer 61 function as the polarized wave output means and polarized wave output control means.

Next, operations by the reader/writer in this embodiment will be described. FIGS. 16A to 16C are diagrams showing operations of the reader/writer in this embodiment and correspond to FIGS. 2A to 2C and 8A to 8C. Referring to FIGS. 16A to 16C, the polarizing method is changed when response signals are not received at some of multiple frequencies in this embodiment. Since the specific details of the processing is the same as those in the flowcharts in FIGS. 3A and 3B except that the polarizing method is only changed instead of the antenna switching in S22 in FIG. 3B, the drawing and description will be omitted.

As described above, the distance from an RFID tag can be obtained securely since multiple receive signals the strengths of which vary differently are obtained when the reflected signals are received from the RFID tag by using the polarizer according to this embodiment. Furthermore, the precision of the measurement can be increased since the distance is estimated by obtaining the phase differences among three frequencies.

Though specific frequencies of multiple frequencies are not especially limited in the embodiments above, a high resolution algorithm such as MUSIC (MUltiple SIgnal Classification) method is used in which the phase information of multiple frequencies at equal intervals is used in order to increase the precision of the distance measurement in a multipath environment.

Therefore, three frequencies at equal intervals to each other are preferably used as the multiple frequencies.

Four or more frequencies may be used not limiting to three as the multiple frequencies. By using five or more frequencies f1 to f5 at equal intervals to each other, three response signals at equal intervals of the frequencies f1, f3 and f5 can be obtained even when the reflected signals of the signals at the frequencies f2 and f4 are not obtained.

Having described the case that a scan antenna is used as the diversity means and that the signals of some frequencies at which the reflected signals have not been received from an RFID tag are only retransmitted by changing the directivity of the scan antenna, the invention is not limited thereto. The same processing may be performed also in a case where multiple antennas are provided or a case that multiple polarized waves are used.

Having described the embodiments of the invention above with reference to drawings, the invention is not limited to the illustrated embodiments. Various changes and modifications are possible in the illustrated embodiments within an identical or equivalent range to that of the invention.

The RFID tag distance measuring system according to the invention can securely measure the distance to an RFID tag since the number of field holes is reduced by using the diversity means in a multipath environment. Therefore, it is advantageously applicable as an RFID tag distance measuring system.

What is claimed is:

1. An RFID tag distance measuring system comprising:
an RFID tag;
a reader configured to output a predetermined carrier signal to an RFID tag and receive a reflected signal of the carrier signal from the RFID tag,
wherein the system estimates the distance between the RFID tag and the reader, the reader comprising:

a signal output unit for outputting signals at multiple different frequencies as the carrier signals;

a transmitting section that transmits the carrier signals output by the signal output unit;

a scan antenna section for transmitting the carrier signals, received from the transmission section, in multiple directions to the RFID tag, the carrier signals having a different electric field strength in each direction, and for receiving reflected signals from the RFID tag, the reflected signals having multiple different frequencies and strengths different from the outputted carrier signals and where the scan antenna section includes at least a plurality of antenna elements, and a divider/combiner for dividing the carrier signals for transmission to the antenna elements and combining the reflected signals received by the antenna elements, and the scan antenna section changes a directivity for transmission and reception of the signals supplied to the antenna elements and the reflected signals by controlling phase differences among the signals to be supplied to the antenna elements by using a phase shifter and a scan control section;

a receiving section that receives the reflected signals from the scan antenna section, the reflected signals having multiple different frequencies and strengths different from the outputted carrier signals; and an estimating unit for estimating the distance between the RFID tag and the reader based on the amount of change in phase between the reflected signals received by the receiving section and the transmitted carrier signals and the frequencies of the transmitted carrier signals, wherein the scan control section controls the reception of reflected waves from the RFID tag of the signals at the multiple different frequencies, which are transmitted through the scan antenna, the scan control section switches from one scan pattern to another scan pattern if the reader does not receive signals from the RFID tag at a first frequency of the multiple different frequencies to the RFID tag, and the scan antenna control section switches from one scan pattern to another scan pattern if the reader does not receive signals from the RFID tag at a first frequency of the multiple different frequencies by using one scan pattern and retransmits signals at a third frequency of the multiple different frequencies to the RFID tag.

2. The RFID tag distance measuring system according to claim 1, wherein the reader includes a polarized wave output means for outputting multiple different polarized waves.

3. The RFID tag distance measuring system according to claim 2, wherein the polarized wave output means has a polarized wave output control means for controlling the receiving section to receive reflected waves from the RFID tag of the signals at the multiple different frequencies, which are transmitted from the transmitting section.

4. The RFID tag distance measuring system according to claim 3, wherein the polarized wave output control means switches to polarized waves in another pattern if the receiving section may not receive signals from the RFID tag of the first frequency of the multiple different frequencies by the transmitting section and retransmits signals at the second frequency of the multiple different frequencies to the RFID tag.

5. The RFID tag distance measuring system according to claim 1, wherein the multiple frequencies, which are different from each other, have equal intervals.

6. The RFID tag distance measuring system according to claim 1, wherein the multiple different frequencies of the carrier signals have equal intervals between frequencies.

* * * * *